(12) United States Patent
Smith

(10) Patent No.: US 7,261,476 B2
(45) Date of Patent: Aug. 28, 2007

(54) MULTI-COMPONENT ASSEMBLY MOUNTING SYSTEM

(76) Inventor: Howard James Smith, Unit 2B Whitehall Street, Stockport, Cheshire (GB) SK7 7LW ( * ) Notice: Subject to any disclaimer, the term of this patent is extended or adjusted under 35 U.S.C. 154(b) by 200 days.

(21) Appl. No.: 11/045,420

(22) Filed: Jan. 28, 2005

(65) Prior Publication Data

US 2005/0169625 A1   Aug. 4, 2005

(30) Foreign Application Priority Data

Jan. 29, 2004  (GB) ................. 0401916.2

(51) Int. Cl.
*G03B 17/00* (2006.01)
*F16M 13/00* (2006.01)

(52) U.S. Cl. ............... 396/422; 248/222.51; 248/125.7; 248/176.1

(58) Field of Classification Search ........ 396/420–422, 396/428; 352/243; 248/218.4, 222.51, 230.1, 248/317, 333, 121, 125.7; 224/908
See application file for complete search history.

(56) References Cited

U.S. PATENT DOCUMENTS

| 4,474,439 A | 10/1984 | Brown |
| 4,976,387 A | 12/1990 | Spianti |
| 5,360,196 A | 11/1994 | DeGiulio et al. |
| 5,435,515 A | 7/1995 | DiGiulio et al. |
| 5,579,071 A | 11/1996 | Wetzel et al. |
| 5,752,112 A | 5/1998 | Paddock et al. |
| 5,797,054 A | 8/1998 | Paddock et al. |
| 2004/0217240 A1* | 11/2004 | Gordon et al. ........... 248/176.1 |

FOREIGN PATENT DOCUMENTS

| GB | 2 021 800 A | 12/1979 |
| WO | WO99/41540 | 8/1999 |
| WO | WO 03/089835 A1 | 10/2003 |

\* cited by examiner

*Primary Examiner*—W. B. Perkey
(74) *Attorney, Agent, or Firm*—Dennison, Schultz & MacDonald

(57) ABSTRACT

A mounting assembly for facilitating the mounting components of a modular system involving a plurality of separate components that are required operationally to interrelate relative to each other when in use so that the relative setting of such components in vertical, horizontal and/or annular orientations with respect to the datum direction is facilitated. A main unit is adapted for mounting to a column support, the main unit being adapted for mounting said components by way of a connection arrangement enabling relative displacement and relative angular setting of the components relative to the base unit.

19 Claims, 5 Drawing Sheets

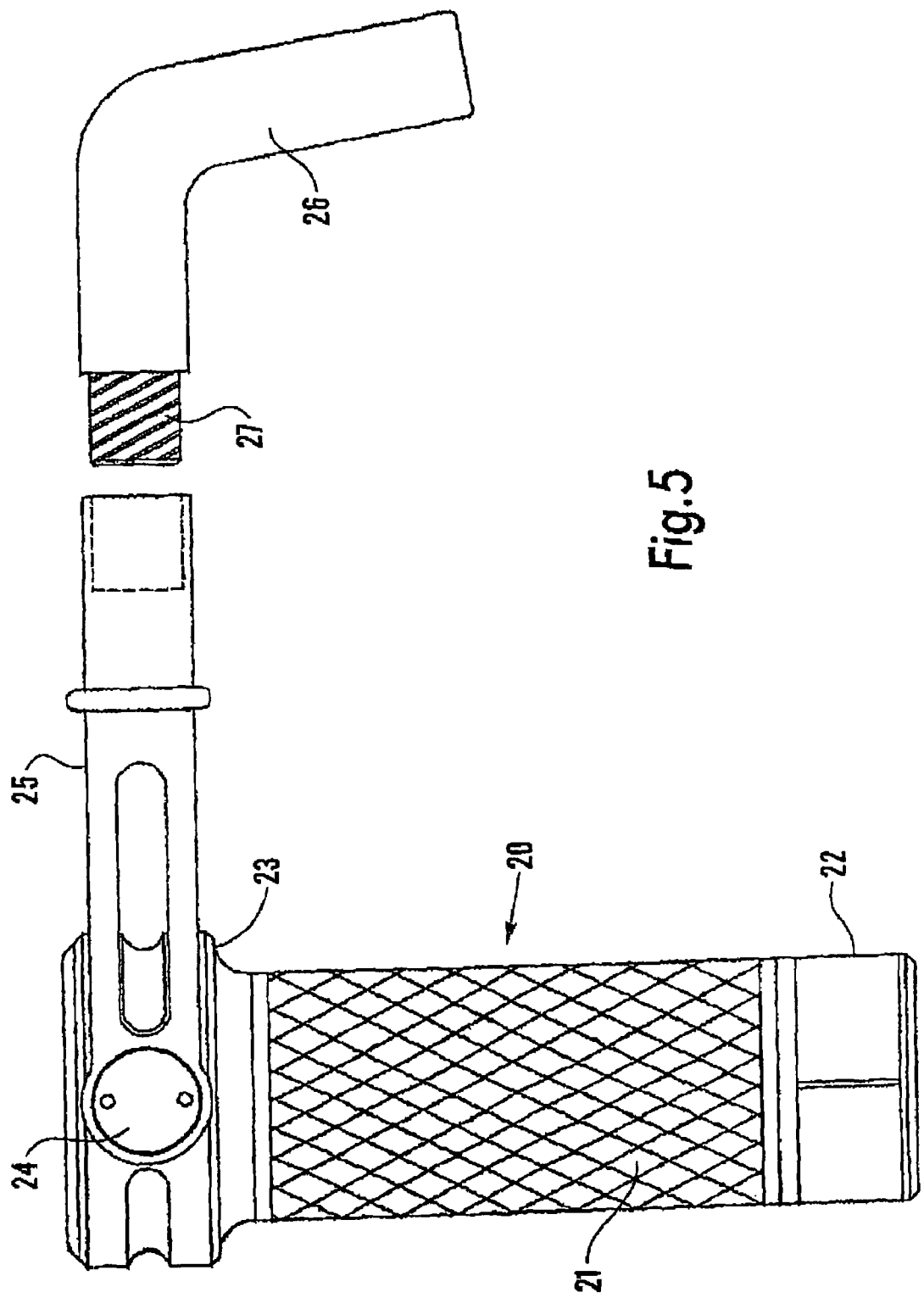

MULTI-COMPONENT ASSEMBLY MOUNTING SYSTEM

BACKGROUND

1. Technical Field

The present invention relates to modular systems for interrelating elements of a multi-component assembly mounting system such as camera utilization apparatus.

In particular the present invention relates to a modular support system for mounting various components associated with an assembly incorporating a camera, batteries, lights, and operator carrier means.

Thus, in particular, the present invention is concerned with the provision of a mounting system for camera equipment in which the camera and associated equipment, such as batteries, lights, etc., are mounted from a support, such as a column, that is intended to be carried by an operator, thereby allowing such operator to move, i.e., by walking, running etc., as may be required during the capture of a scene being filmed or photographed.

2. General Background

It is known to provide a modular system by means of which a camera assembly can be operationally associated with ancillary apparatus such as lighting units, electrical supply batteries, monitors and systems facilitating the orientation of the actual camera when required for and when in use. An exemplary system is disclosed in PCT International Publication WO 03/089835 A1, which is hereby incorporated by reference.

In particular, a mounting system is provided for body mounted camera equipment that, during the use of the camera, the camera together with a number of associated accessories such as lights, and batteries for operating the camera and lights, are carried from a support column with the camera mounted to the upper end of the column.

The column itself is conventionally provided with a gimbals support means which can be supported by the user by way of a body harness. An exemplary body harness that can be used with the present invention is disclosed in U.S. Pat. No. 4,976,387, which is hereby incorporated by reference. With this arrangement, the user's hands are free to operate the controls of the camera and any associated equipment.

The known apparatus, whilst providing for an element of operational relative adjustability of the associated components, has been found inherently to involve certain short comings and constraints in component adjustability in practical use.

With the known component mounting systems the various components are essentially positionally fixed in such manner that it is not readily possible for a user of the equipment easily to make adjustments to settings when adjustment is desired during use.

This situation has been found to be a serious practical usage disadvantage in that it adversely limits the usefulness of the system whenever filming conditions require position adjustments to the various components mounted from the column. It will be appreciated that whilst filming, any undue delay in resetting the positioning and settings of components can be a significant operational disadvantage.

Bearing in mind the point that, as the system is being physically carried by an operator by way of the gimbals supporting system, it is generally necessary to set the various components relative to the support column, and thus the datum, so that any chance of the components impeding the handling of the system should be avoided so as to enhance the ease by which the equipment may be carried and used by an operator.

It is an object of the present invention to increase the adjustably of one or more components of a modular system of the kind above mentioned.

BRIEF SUMMARY

Broadly, according to a first aspect of the invention, a mounting assembly is provided for mounting components of a modular system involving a plurality of separate components required operationally to interrelate relative to each other when in use, characterized by component mounting means adapted to facilitate the ease of setting of the components into required relative angular and positional settings with respect to each other.

According to a second aspect of the invention, a mounting assembly is provided for facilitating the mounting components of a modular system involving a plurality of separate components that are required operationally to interrelate relative to each other when in use, characterized in that the relative setting of such components in vertical, horizontal and/or annular orientations with respect to a datum direction is facilitated, and characterized by a main unit adapted for mounting to a support, the main unit being adapted for mounting said components by way of a connection arrangement enabling relative displacement and relative angular setting of said components relative to the base unit.

Additional aspects of the present invention will become apparent to those skilled in the art upon consideration of the following description of an embodiment illustrated in the drawings. The components in the Figures are not necessarily to scale, emphasis instead being placed upon illustrating the principles of the invention. Moreover, in the Figures, like referenced numerals designate corresponding parts throughout the different views.

BRIEF DESCRIPTION OF THE DRAWINGS

FIG. 5 is a diagrammatic view of apparatus of FIG. 4 incorporating the concepts of the invention when in a second operational position.

DESCRIPTION OF THE PREFERRED EMBODIMENTS

Figure 1:
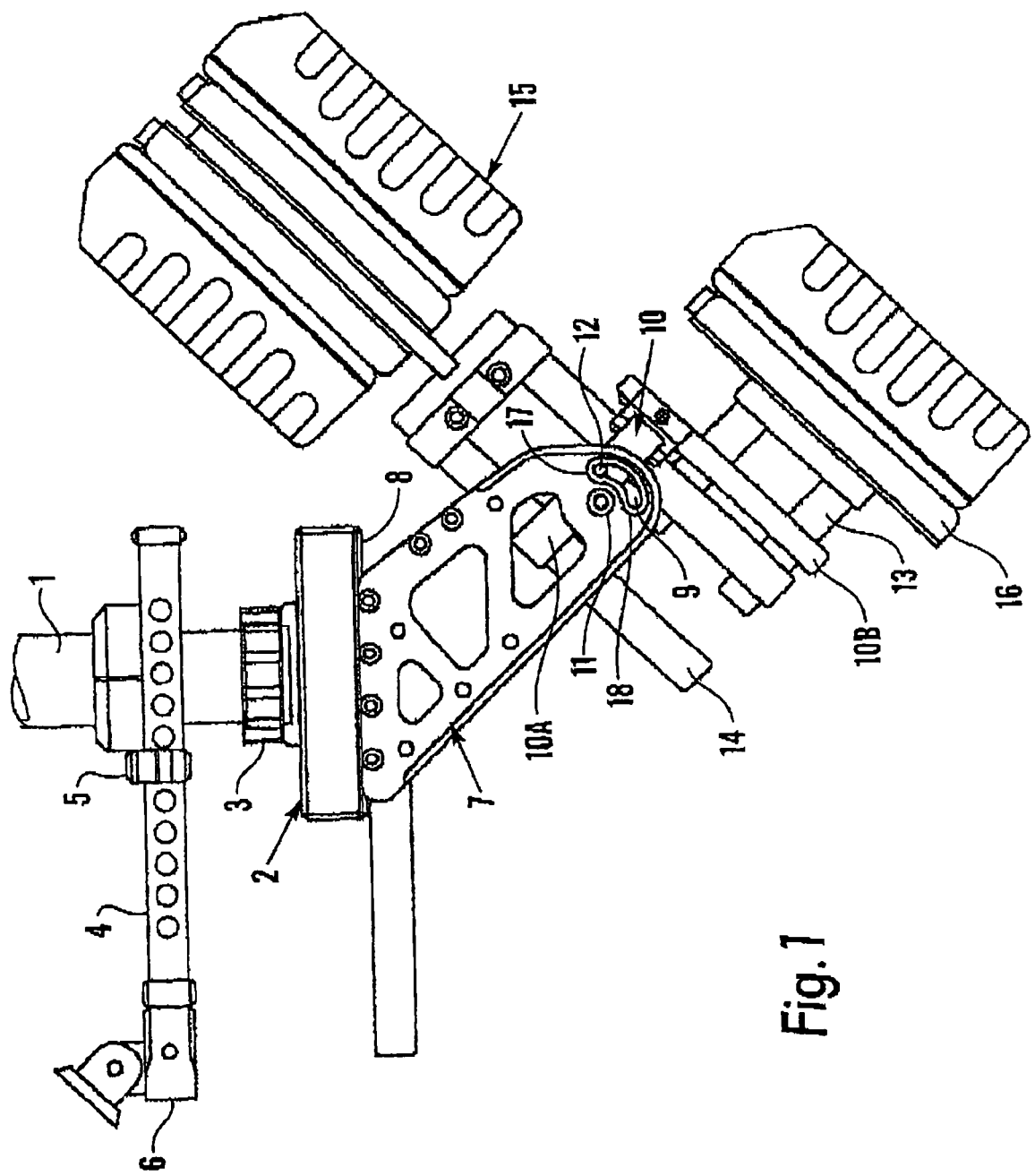
FIG. 1 is a diagrammatic view of a part of the apparatus incorporating the concepts of the invention when in a first operational end position.
Figure 2:
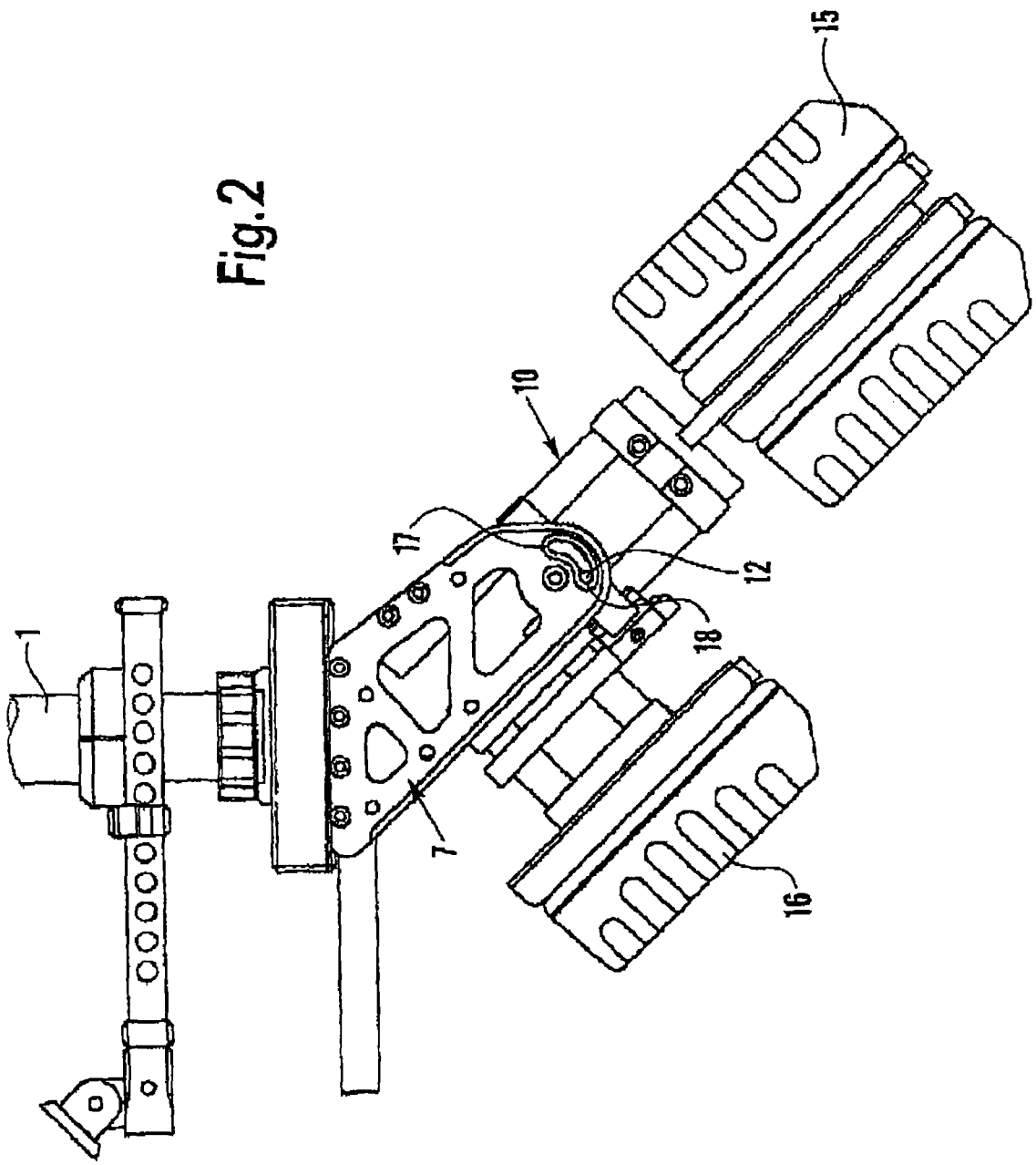
FIG. 2 is a diagrammatic view of the apparatus of FIG. 1 when in a second operational end position.
Figure 3:
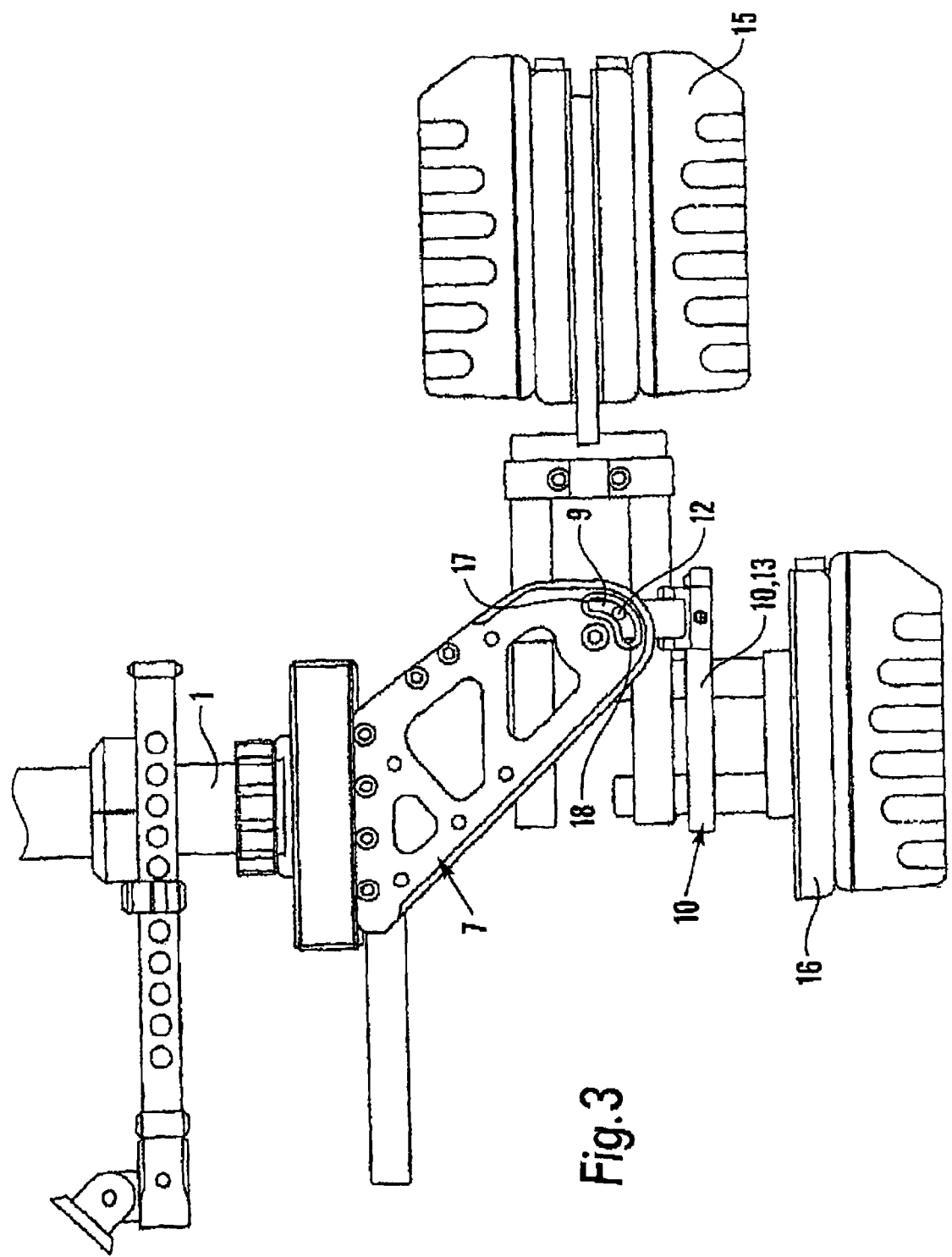
FIG. 3 is a diagrammatic view of the apparatus of FIGS. 1 and 2 when in an intermediate setting.

Referring now to FIGS. 1–3, and particularly to FIG. 1, a fragmentary part of a support column or post for a camera installation is indicated at 1. A base unit 2 is mounted to the lower end of the post 1 by way of a manually operated locking ring 3.

In practice, a camera (not shown) is mounted to the upper end of the post 1, as shown, for example, in PCT International Publication WO 03/089835 A1.

A support bracket 4 is mounted to the column above the base unit 2 at any convenient position and orientation along the column 1. As will be noted, this bracket 4 is axially displaceable lengthways of the column, and is lockable in any required position by a locking ring 5. As will also be noted, the bracket 4 is provided with a component connection arrangement 6 for the mounting of a component or components (not shown), such as lights, microphone, etc. The bracket 4 can be extensible to permit lateral displacement of the component connection arrangement 6 with respect to the column 1.

It is convenient to note that a gimbals unit (not shown in FIG. 1) is conventionally provided on the column or post to enable the column 1 to be carried by the user by way of a body harness that leaves the user's hands free for handling the components of the system. A suitable gimbals unit 20 is described below in connection with FIGS. 4 and 5.

A downwards directed support bracket 7 is mounted to the underside 8 of the main base unit 2. The longitudinal direction of the bracket 7 is set to be at 45 degrees below the plane of the base unit 2. The bracket 7 can be pivoted around the longitudinal axis of column 1 by manual adjustment of base 2 relative to locking ring 3.

An arcuate slot 9 is provided at the free end of the bracket 7. A generally L-shaped component mounting arrangement 10 is pivotally mounted by way of a pivot 11 to the bracket 7. The mounting arrangement 10 is provided with a pin 12 that engages within the arcuate slot 9 on bracket 7 to define the limits of movement of the mounting arrangement 10 with respect to the bracket 7.

The mounting arrangement 10 can conveniently be considered as having a first component support arm 13, which is slidably mounted in a leg 10A of the mounting arrangement 10. A second component support arm 14 is slidably mounted in the leg 10B of the mounting arrangement 10. The second component support arm 14 thus extends at right angles to the support arm 13.

As shown in FIG. 1, a component 15 is mounted to the arm 13, and a component 16 is mounted to the arm 14. In practice these components 15, 16 can be batteries, gyros or whatever other components are required to be mounted to the lower end of the column 1.

As is shown in the FIG. 1, the mounting arrangement 10 is so positioned with respect to the bracket 7 that the pin 12 is positioned at an end 17 of the arcuate slot 9. When the pin is so located, it will seem that the components 16 are positioned as shown with respect to the bracket/arm 7 and thus in a preset position with respect to the main base unit 2 and the column 1.

FIG. 2 illustrates the positioning of the L-shaped mounting arrangement 10 relative to the bracket 7 when the pin 12 is abutting the other end 18 of the arcuate slot 9.

The arcuate length of the slot 9 is such that displacement of the pin 12 from the slot end 17 to the slot end 18 rotates the L-shaped mounting arrangement 10 through 90 degrees of arc to the position shown in FIG. 2. In other words, the components 15 and 16 have been rotated (as shown by FIGS. 1 and 2) clockwise through 90 degrees.

In practice, the pin 12 can include a finger operable locking member such as a knurled nut, wing nut or other convenient means by which the mounting arrangement 10 can be firmly locked in a required setting relative to the bracket 7.

FIG. 3 illustrates the setting of the L-shaped mounting arrangement 10 and its associated components 15 and 16 when the pin 12 is at a mid-way position along the arcuate slot 9.

In practice, the mounting connections between the components 15 and 16 and the L-shaped mounting arrangement 10 can be such as to also allow these components to be independently rotatable about the respective longitudinally axes of the associated arms 13 and 14.

The legs 10A and 10B of the L-shaped mounting arrangement 10 also effectively provide guides by which the arms 13 and 14 can slide such as to enable the positions of the components 15 and 16 to be adjusted relative to the associated legs 10A and 10B to be closer to or more distance from the associated one of the legs 10A and 10B. It will be understood that means can be provided for locking the arms 13 and 14 in any selected position relative to the legs 10A and 10B, respectively.

Figure 4:
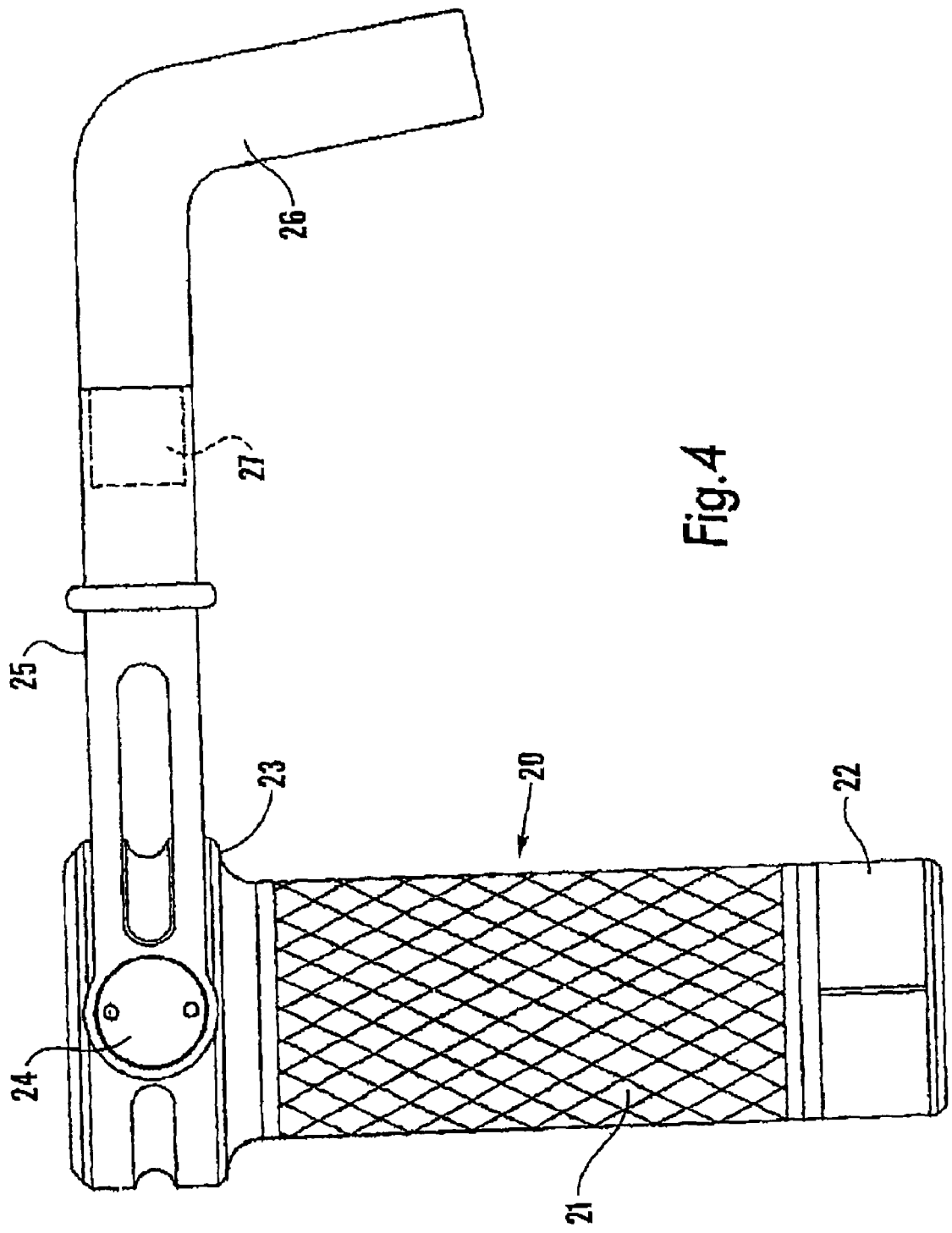
FIG. 4 is a diagrammatic view of a further component of apparatus incorporating the concepts of the invention when in a first operational position.

As has been mentioned, the column 1 is generally supported when in use by means of a gimbals type support. One such gimbals type support 20 is illustrated in FIGS. 4 and 5. In particular, these Figures illustrate a gimbals unit 20 associated with a camera installation whereby the camera can be maintained in a predetermined orientation with respect to the user.

As will be noted, the gimbals unit has a main body 21 that can be suitably knurled to provide a hand grip. The unit 20 is mountable to the column 1 so as to be longitudinally movable along the column 1 to any required position. The unit 20 is also selectively rotatable with respect to the column 1. The unit 20 includes a locking ring 22 by means of which the gimbals unit 20 can be fixed at a required position on the column 1.

The gimbals unit 20 incorporates a handle structure 23 that mounted from the upper part 23 of the unit 20. This upper part 23 is rotatable about the column 1.

The handle structure 23 is pivotally mounted to the upper part 23 by diametrically opposed pivot members 24 so as to be pivotable about an axis that is transverse to the longitudinal axis of the main body 21 and thus the column 1 surrounded by the main body 21.

The handle structure 23 can be regarded as of a generally two section arrangement including a first section 25 pivoted to the upper part 23 and a second section 26 selectively attachable to the first section 25. The attachment can be by any convenient means such as screwed thread as indicated at 27 or a firm push fit. The second section 26 can be conveniently coupled to a body-mounted support (not shown).

FIG. 4 illustrates the gimbals unit 20 when the two sections 25 and 26 are connected together. FIG. 5 illustrates the gimbals unit 20 when the second section 26 has been disconnected from the first section 25.

The gimbals unit 20 provides a triple axis adjustment facility. The combination of the arrangement of FIGS. 1 to 3 together with that of FIGS. 4 and 5 provides a combination that provides many degrees of freedom of relative movements available for the various component mounting positions.

In addition, the nature of the mountings, in practice, greatly facilitates the ease by which components can be mounted one relative to the other and interchanged whenever desired.

For example, with the above described apparatus the provision of, for example, removable battery rear battery mounts or gyros in conjunction with a pivot mounted mount is such that the balance of the base unit and the loads of the components attached thereto (i.e., batteries) when used as a part of apparatus known as a sled always remains the same throughout the range of tilt of the mounting bracket or the like.

While various embodiments of the invention have been described, it will be apparent to those of ordinary skill in the art that many more embodiments and implementations are possible within the scope of the invention. Throughout this specification, unless the context requires otherwise, the words "comprise" and "include" and variations such as "comprising" and "including" will be understood to imply the inclusion of an item or group of items, but not the exclusion of any other item or group items. Furthermore, although various indications have been given as to the scope of this invention, the invention is not limited to any one of these but may reside in two or more of these combined together. Accordingly, the invention is not to be restricted except in light of the following claims and their equivalents.

The invention claimed is:

1. A mounting assembly for facilitating the mounting of components of a modular system to a column, the mounting assembly comprising: a base coupled to a lower end of a column, a support bracket having an upper end coupled to the base, the support bracket extending at a downward angle with respect to the column, and a mounting arrangement adapted to mount to at least two components spaced from each other, the mounting arrangement being pivotally coupled to a lower portion of the support bracket to permit angular positioning of the at least two components with respect to the column.

2. The mounting assembly of claim 1 further comprising a locking ring for locking the base to the lower end of the column at a fixed orientation.

3. The mounting assembly of claim 1 wherein the lower portion of the support bracket includes an arcuate slot, and the mounting arrangement includes a pin engaging the slot to limit the extent of pivotal displacement of the mounting arrangement with respect to the support bracket.

4. The mounting assembly of claim 3 wherein the pin includes locking means for selectively locking the mounting arrangement at a selected pivotal position with respect to the support bracket.

5. The mounting assembly of claim 1 wherein the mounting arrangement includes two legs that are arranged at a fixed angle with respect to each other.

6. The mounting assembly of claim 5 further comprising an arm coupled to each leg, each arm being coupled to at least one of said components.

7. The mounting assembly of claim 6 wherein each arm is longitudinally displaceable with respect to the leg to which the arm is coupled.

8. The mounting assembly of claim 7 wherein each leg includes locking means for locking the arm associated therewith at a selected position with respect to the leg.

9. The mounting assembly of claim 1 further comprising a second support bracket coupled to said column above said base, the second support bracket having an arm extending at right angle to the column.

10. The mounting assembly of claim 9 further comprising a locking ring surrounding the column for fixing the longitudinal position and angular orientation of the second support bracket with respect to the column.

11. The mounting assembly of claim 9 further comprising a component connection arrangement situated at an outer end of the arm.

12. The mounting assembly of claim 11 wherein the arm is extensible to permit lateral positional adjustment of the component connection arrangement with respect to the column.

13. The mounting assembly of claim 9 further comprising a gimbals type support coupled to the column.

14. A mounting assembly for facilitating the mounting of components of a modular system to a body supportable column having a gimbals type support coupled to the column, the mounting assembly comprising: a base coupled below the gimbals type support at a lower end of a column, a first support bracket having an upper end coupled to the base, the support bracket extending at a downward angle with respect to the column, a mounting arrangement adapted to mount to at least two components spaced from each other, the mounting arrangement being pivotally coupled to a lower portion of the support bracket to permit angular positioning of the at least two components with respect to the column, and a second support bracket coupled to the column above the base, the second support bracket having an arm extending at right angle to the column having a component connection arrangement situated at an outer end of the arm.

15. The mounting assembly of claim 14 wherein the lower portion of the first support bracket includes an arcuate slot, and the mounting arrangement includes a pin engaging the slot to limit the extent of pivotal displacement of the mounting arrangement with respect to the first support bracket, the pin including a finger operable locking member for selectively locking the mounting arrangement at a selected pivotal position with respect to the first support bracket.

16. The mounting assembly of claim 14 wherein the mounting arrangement comprises two legs that are arranged at right angle to each other, an arm coupled to each leg, each arm being coupled to at least one of said components, each arm being longitudinally displaceable with respect to the leg to which the arm is coupled, and each leg including locking means for locking the arm associated therewith at a selected position with respect to the leg.

17. The mounting assembly of claim 14 further comprising a locking ring surrounding the column for fixing the longitudinal position and angular orientation of the second support bracket with respect to the column, and a second locking ring surrounding the column for locking the base to the lower end of the column at a fixed orientation.

18. The mounting assembly of claim 14 wherein the gimbals type support comprises a cylindrical unit surrounding the column having a knurled outer surface, a locking ring for fixing the unit at a selected position on the column, a handle structure, and diametrically opposed pivot members situated on opposite sides of the column and coupling the handle structure to the cylindrical unit.

19. The mounting assembly of claim 18 wherein the handle structure comprises a first section connected to the pivot members and a second section coupled to an outer end of the first section.

* * * * *